L. B. TEBBETTS, 2D.
METHOD OF MAKING COMPOSITE METAL PLATES.
APPLICATION FILED DEC. 29, 1910.
1,011,524.
Patented Dec. 12, 1911.
Fig. I.
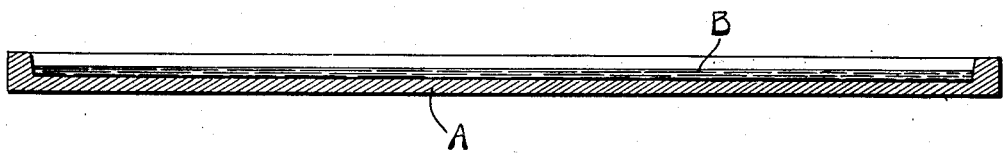
Fig. II.
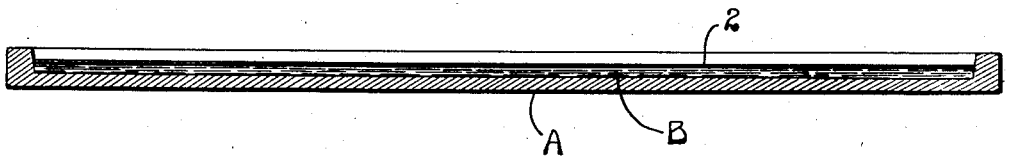
Fig. III.
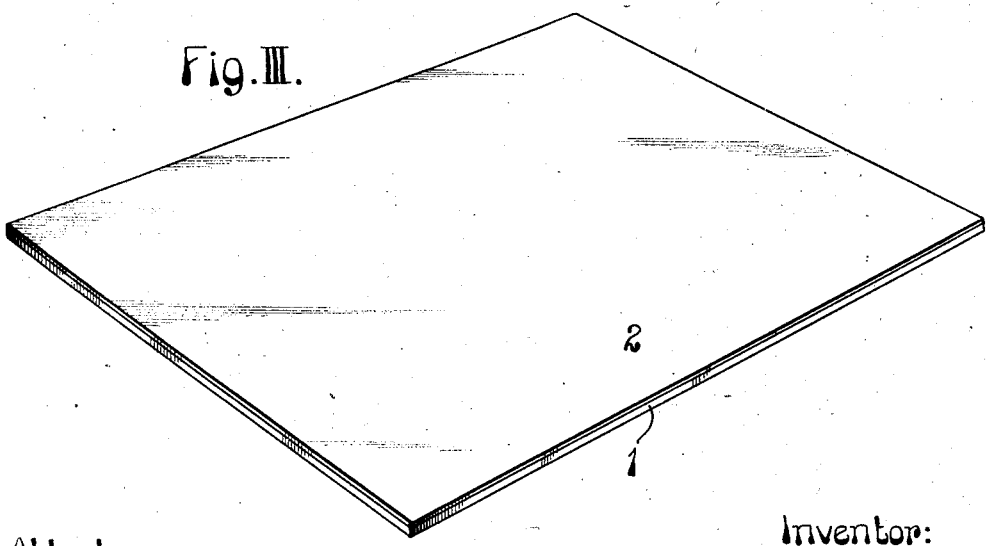
Attest
a. J. McCauley
E. B. Finn
Inventor:
L. B. Tebbetts 2d
ATTY'S. Knight Cook
BY E. S. Knight

UNITED STATES PATENT OFFICE.

LEWIS B. TEBBETTS, 2D, OF ST. LOUIS, MISSOURI, ASSIGNOR OF ONE-HALF TO HOYT METAL COMPANY, OF ST. LOUIS, MISSOURI, A CORPORATION.

METHOD OF MAKING COMPOSITE METAL PLATES.

1,011,524.      Specification of Letters Patent.     Patented Dec. 12, 1911.

Application filed December 29, 1910. Serial No. 599,902.

*To all whom it may concern:*

Be it known that I, LEWIS B. TEBBETTS, 2d, a citizen of the United States of America, residing at the city of St. Louis and State of Missouri, have invented certain new and useful Improvements in Methods of Making Composite Metal Plates, of which the following is a full, clear, and exact description, reference being had to the accompanying drawing, forming part of this specification.

My invention relates to a method whereby two metal bodies of different kind are integrally connected in a manner to provide a most secure bond between them.

The object of the invention is to produce a composite metal plate in which one metallic body surface serves as a base for the other or facing body, to give rigidity and strength thereto, the base body being of a less valuable metal than the facing body. My method makes it possible to produce metallic plates having facings of an expensive metal at a much less expense than would be incurred if the entire plate produced were made of the more expensive metal.

Figure I is a longitudinal section of the mold used in carrying out my method and showing molten base metal therein. Fig. II is a view similar to Fig. I, with the facing metal present in the mold above the base metal. Fig. III is a perspective view of a composite plate made by carrying out my method.

In making composite metal plates by my method, I first produce an ingot utilizing as a base metal, or in other words, as a metal from which the main body of the ingot is produced, a metal of inexpensive description as compared with a more valuable metal that is utilized as a facing and which base metal is of preferably greater specific gravity than the specific gravity of the facing metal. As instances of the base metal employed, I mention as that preferably used either lead or a lead alloy, the last mentioned of which may comprise lead and antimony, or lead antimony and tin; or lead, antimony, tin and copper.

The facing metal utilized is a metal, or metal alloy, of preferably less specific gravity, as previously indicated, than the specific gravity of the base metal and is preferably britannia metal, or an alloy composed of not less than 50% of tin, and the remainder of other metals, such as antimony, copper, nickel, and aluminum.

In carrying out my method, I first melt the base metal and place it in a molten condition in a suitable open face mold, such as that indicated by A in the drawing, the molten base metal being designated B. After skimming the dross or bubbles from the top of the base metal, I place on said base metal, while it remains in a molten state, an unmolten body of facing metal, said facing metal being preferably in the form of a rolled sheet. The facing body floats on the surface of said molten base metal until it has become fused thereto and, after fusing, remains at the top of the base metal until both layers of metal have become cooled, without either metal entering appreciably into the texture of the other metal, and without either layer of metal losing its identity.

By carrying out my method, I produce an ingot or slab of composite metal, comprising the base layer 1 and facing layer 2. This ingot is utilized to produce the composite metal plate by rolling it to the desired thickness between suitable rolls.

My method provides for the production of composite metal plates that may be used for various purposes, one of the important uses of such a plate being the furnishing of a metallic body having a face that may be readily operated upon by engraving tools and one that is much more desirable in this connection than that furnished in a solid homogeneous metallic plate, for the reason that an alloy exactly suitable for the operation of engraving tools therein is supplied without the necessity of its containing a stiffening metal through which the engraving tools will not readily cut. It is also obvious that a composite metal plate made in accordance with my improvement has many other uses, as it is highly desirable in making utensils, metal ornaments, novelties, and other articles into which an inexpensive base metal may enter and a finish therefor be provided by the layer, or layers, of facing that enter into my composite plate.

It is obvious that many other metals than those specified herein may be utilized to produce composite metal plates according to the steps in my method, in which connection it is only essential that the metals be of such properties as to permit of their union when the described steps are carried out.

I would add that it is possible by my method to produce composite metal plates having facings at opposite sides of a base metal. In producing a composite plate of this description, the steps hereinbefore described are first carried out and the ingot thereby produced is placed in a mold with the facing first applied to the base laid lowermost, and the base uppermost. I then introduce into the mold on top of the base metal a suitable quantity of molten base metal which becomes fused to the surface of the base metal first molded, and introduce into the mold a second body of facing metal. This second body of facing metal becomes fused to the fresh molten metal, on which it floats in a manner similar to that previously stated until fusion to the base metal takes place. The result is that the base metal has applied to it two layers of facing metal that provide for the production of a rolled sheet with a double facing instead of a single facing.

It is highly essential in carrying out my method of making composite bodies that the base metal, or that introduced into the mold in a molten state be of less fusibility than the facing metal or alloy introduced into the mold in an unmolten state and that the molten metal of the least fusibility be utilized to furnish heat for the melting of the metal of the greatest fusibility. The molten metal of the least fusibility in giving up a portion of its heat for the melting of the unmolten metal of greater fusibility becomes chilled at its face touched by the unmolten metal, with the result of solidification of its face portion, thus preventing mixtures of the two metal bodies while providing just the proper degree of temperature to effect their most perfect union. In this connection it is to be noted that immediately after the unmolten metal of the greatest fusibility is placed on the molten metal of the least fusibility, the previously unmolten metal will become molten by the heat imparted thereto from the molten metal and the two metal bodies will remain molten for only an instant of time during which the union takes place between them, and following which both of the metals become immediately solidified at their contacting surfaces, with the result of preventing any appreciable impenetration of one metal body into the other.

Other important advantages of my method as compared with previous methods of making composite metal objects are the following: By reason of one of the bodies of metal utilized in carrying out the method being in a molten state while the other is in an unmolten state and is placed in such condition on the molten metal, there is no liability of disturbance of the molten metal, nor liability of one metal sinking into the other metal, as would be the result if the top metal were poured into a mold in a molten state; in which latter instance the poured metal must unquestionably have a tendency to force it way by gravity into the soft or molten metal on which it is poured. The facing layer of metal produced by my method is therefore, rendered one of perfect evenness throughout its thickness at its surface and at the line of contact between it and the body of metal to which it is joined. It is unnecessary to employ skilled labor in carrying out my method, as the only requisites are that the metal of the least fusibility be reduced to a molten state and the metal of the greatest fusibility be placed, while in an unmolten state, in contact with the molten metal of the least fusibility, these being acts that may be carried out by unskilled labor as compared with the necessity of employing skilled labor in carrying out any methods for the production of composite metals heretofore known.

I claim:—

1. The method of making composite metal plates which consists in placing molten metal in a suitable open face mold and then placing on the molten metal a solid sheet of metal more readily fusible than the molten metal.

2. The method of making composite metal plates which consists in placing molten metal in a suitable open face mold and then placing on the molten metal a solid sheet of a metal of less specific gravity than the molten metal.

3. The method of making composite metal plates which consists in placing molten metal in a suitable open face mold and then placing on the molten metal a solid sheet of a metal more readily fusible and of less specific gravity than the molten metal.

LEWIS B. TEBBETTS, 2D.

In the presence of—
  A. J. McCAULEY,
  E. B. LINN.